United States Patent
Herron

(10) Patent No.: US 7,433,080 B2
(45) Date of Patent: Oct. 7, 2008

(54) SYSTEM AND METHOD FOR CONVERSION OF DUOTONE IMAGES FOR DISPLAY

(75) Inventor: Stephen K. Herron, Ladea Ranch, CA (US)

(73) Assignees: Toshiba Corporation (JP); Toshiba Tec Kabushiki Kaisha (JP)

(*) Notice: Subject to any disclaimer, the term of this patent is extended or adjusted under 35 U.S.C. 154(b) by 830 days.

(21) Appl. No.: 10/951,401

(22) Filed: Sep. 28, 2004

(65) Prior Publication Data

US 2006/0072129 A1 Apr. 6, 2006

(51) Int. Cl.
H04N 1/60 (2006.01)
G06K 9/00 (2006.01)
G06K 15/00 (2006.01)
G03F 3/08 (2006.01)

(52) U.S. Cl. .............. 358/1.9; 358/518; 358/2.1; 358/3.23; 382/162; 382/167

(58) Field of Classification Search .............. 358/1.9, 358/3.06, 3.2, 2.1, 530, 500, 518, 3.23; 345/435, 345/601, 584; 235/469, 494; 283/114, 93; 382/162, 167, 284, 294

See application file for complete search history.

(56) References Cited

U.S. PATENT DOCUMENTS

| | | | |
|---|---|---|---|
| 5,146,346 A * | 9/1992 | Knoll | 382/167 |
| 5,185,661 A | 2/1993 | Ng | |
| 5,499,305 A | 3/1996 | Lidke et al. | |
| 5,537,228 A | 7/1996 | Dillinger | |
| 5,553,200 A | 9/1996 | Accad | |
| 5,602,579 A | 2/1997 | Ambalavanar et al. | |
| 5,611,030 A | 3/1997 | Stokes | |
| 5,644,509 A | 7/1997 | Schwartz | |
| 5,666,543 A | 9/1997 | Gartland | |
| 5,734,800 A | 3/1998 | Herbert et al. | |
| 5,740,333 A | 4/1998 | Yoh et al. | |
| 5,818,032 A * | 10/1998 | Sun et al. | 235/494 |
| 5,822,503 A | 10/1998 | Gass, Jr. et al. | |
| 5,870,530 A | 2/1999 | Balasubramanian | |
| 5,982,924 A | 11/1999 | Power et al. | |
| 6,081,253 A | 6/2000 | Luke et al. | |
| 6,185,013 B1 | 2/2001 | Harrington et al. | |
| 6,343,159 B1 * | 1/2002 | Cuciurean-Zapan et al. | 382/284 |
| 6,456,395 B1 | 9/2002 | Ringness | |
| 6,459,501 B1 | 10/2002 | Holmes | |

(Continued)

FOREIGN PATENT DOCUMENTS

WO WO-98/05510 A2 2/1998

(Continued)

Primary Examiner—Edward L. Coles
Assistant Examiner—Charlotte M Baker
(74) Attorney, Agent, or Firm—Tucker Ellis & West LLP

(57) ABSTRACT

A method for processing an image. The method includes receiving an image having image values and described in a first color space and determining the image color space from a received image. Image values in the first color space are associated with values in a second color space so as to generate associated image values. Values in the second color space are converted to a third color space for display, wherein the third color space differs from the second color space by including additive primary colors.

16 Claims, 2 Drawing Sheets

U.S. PATENT DOCUMENTS

| | | |
|---|---|---|
| 6,559,975 B1 | 5/2003 | Tolmer et al. |
| 6,757,078 B1 * | 6/2004 | Bai et al. .................. 358/1.9 |
| 2002/0006230 A1 | 1/2002 | Enomoto |
| 2003/0007164 A1 | 1/2003 | Lee et al. |
| 2003/0030825 A1 | 2/2003 | Kubo et al. |
| 2003/0197877 A1 | 10/2003 | Lee |
| 2004/0027593 A1 | 2/2004 | Wilkins |
| 2004/0119992 A1 | 6/2004 | Falk et al. |
| 2005/0099431 A1 * | 5/2005 | Herbert et al. .............. 345/601 |

FOREIGN PATENT DOCUMENTS

| | | |
|---|---|---|
| WO | WO-98/05510 A3 | 2/1998 |

* cited by examiner

SYSTEM AND METHOD FOR CONVERSION OF DUOTONE IMAGES FOR DISPLAY

BACKGROUND OF THE INVENTION

The present invention is directed to a system and method for processing an image. More specifically, the present invention is directed to a method of generating additive primary colors from PostScript code to drive a visual display.

A primary application of the PostScript language is to describe the appearance of text, graphical shapes, and sampled images on printed or displayed pages according to the Adobe imaging model. More specifically, a program in the PostScript language communicates a description of an image or document from a composition system to a printing system or control the appearance of text and graphics on a display. Within the PostScript language, colors are suitably specified in a variety of ways including: grayscale, red, green, and blue (RGB), cyan, magenta, yellow, and black (CMYK), and Commission Internationale de l'Eclairage-based (CIELab).

Furthermore, a duotone is the result of a method to colorize a grayscale image or to create a visual special effect. The term "duotone" refers to an image reproduced with two colorants. A duotone differs from a spot color. A spot color is defined by coordinates in a color space. In contrast, a duotone is defined by either a vector from a white point to the maximum saturation value defined by the spot color coordinates in that color space, a plane defined by the vector of two colors, or, in the case of three or more spot colors, a three dimensional gamut defined by the vector of the three spot colors from white to each saturation value.

Duotone use represents one of the more difficult color reproductions in image generation, particularly in the values of each colorant used. In addition to duoton, monotones, one color, tritons, three colors, and quadtones, four colors, are also known for image generation. The term quadtone is often times confusing. In some instances, a quadtone refers to an image reproduced with four spot colorants. In other instances, a quadtone is used by photographers to describe images produced in 4, 6, and 7 shades of black and gray colorants on an inkjet printer or offset press. As used herein, the term duotone will be used to refer to an image produced with any number of colorants.

As mentioned, an original intent of the PostScript language, and of a duotone, is to prepare data contained in a grayscale image for reproduction with user selected colorants, such as a number of black and spot or match colorants. However, it is also useful to prepare these images for reproduction on printers having cyan, magenta, yellow, and black (CMYK) colorants and for display on red, green, and blue (RGB) monitors. Therefore, a conversion from named colorants to device colorants is desirous. Moreover, there is a need for a system and method for generating additive primaries for visual display, such as in a monitor with red, green, and blue (RGB) data being generated from PostScript code.

SUMMARY OF THE INVENTION

In accordance with the present invention, there is provided a system and method for processing an image. Further, in accordance with the present invention, there is provided a system and method that generates monitor red, green, and blue (RGB) data from PostScript code.

Still further, in accordance with the present invention, there is provided a system for processing an image. The system includes means adapted for receiving an image having image values and described in a first color space, means adapted for determining the image color space from a received image, means adapted for associating the image values in the first color space to values in a second color space so as to generate associated image values, and means adapted for converting the associated values in the second color space to a third color space for display, the third color space differing from the second color space by including additive primary colors.

In a preferred embodiment of the preset invention, the image is described in the PostScript language and the third color space is the red, green, and blue (RGB) color space.

In another embodiment of the present invention, a three-dimensional look up table (LUT) created in CIELab color space is used for looking up, referencing, and/or converting colorant values.

Still further, in accordance with the present invention, there is provided a method for processing an image. The method comprises the steps of receiving an image having image values and described in a first color space and determining the image color space from a received image. The method further includes associating the image values in the first color space to values in a second color space so as to generate associated image values and converting the associated values in the second color space to a third color space for display, the third color space differing from the second color space by including additive primary colors.

In a preferred embodiment of the present invention, if the image is determined to be a grayscale image, the method further includes the steps of requesting linearization curves, requesting colorants, obtaining CIELab values, and associating gray levels with steps in CIELab. If the image is determined not to be a grayscale image, the method further includes the steps of converting the image to a grayscale image, requesting linearization curves, requesting colorants, obtaining CIELab values, and associating gray levels with steps in CIELab. Similarly, if the image is determined to be a duotone, the method further includes the steps of reading colorants, converting the image values to CIELab values, and associating gray levels with steps in CIELab.

These and other aspects, advantages, and features of the present invention will be understood by one of ordinary skill in the art upon reading and understanding the specification.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

Figure 1:
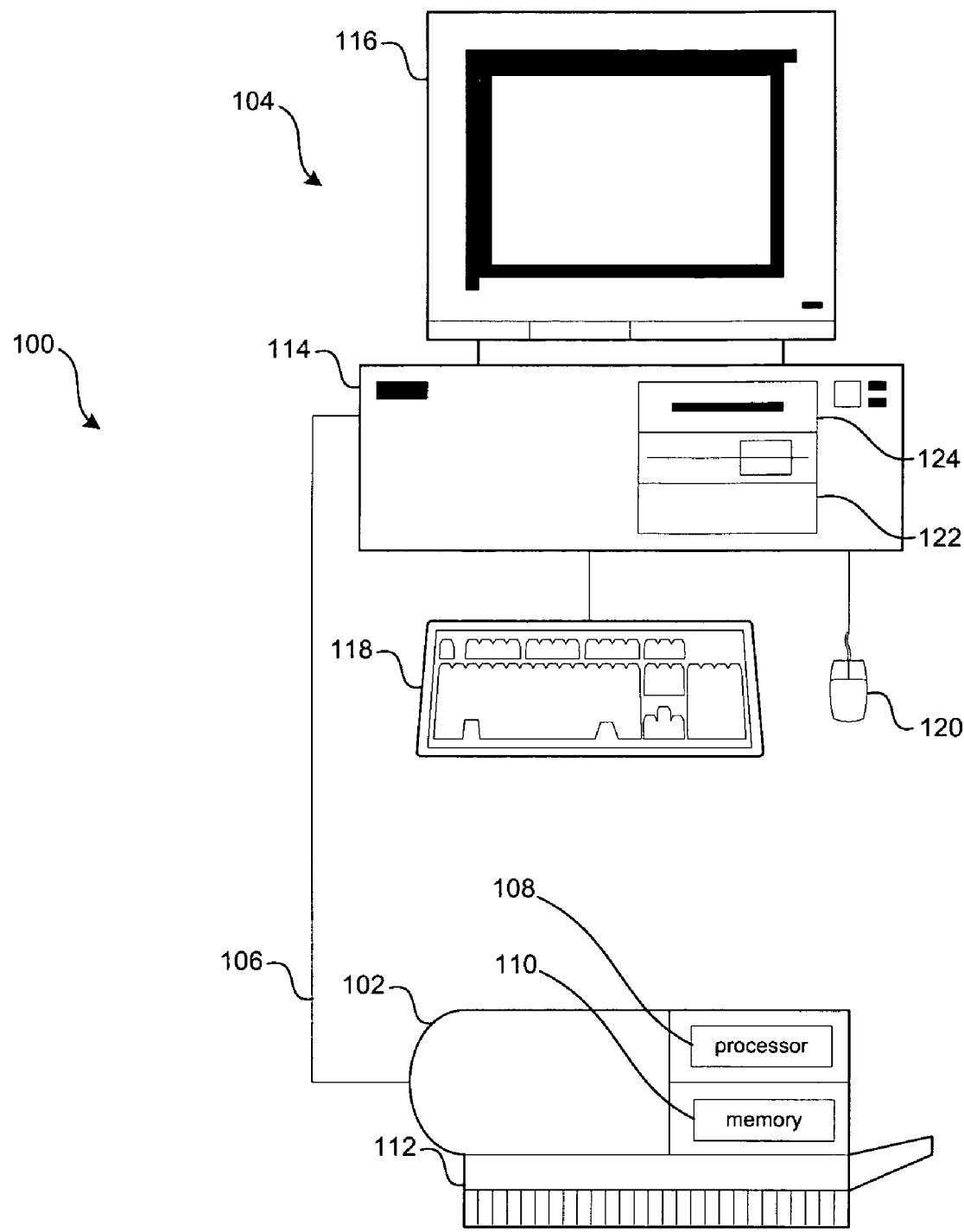
FIG. 1 is a block diagram illustrative of the system of the present invention.

The present invention is directed to a system and method for processing an image. In a preferred embodiment, the present invention is directed to a method of generating monitor red, green, and blue (RGB) data from PostScript code. FIG. 1 is a block diagram illustrating an exemplary environment for practicing the present invention. System 100 comprises an image generating device 102 and a hardware platform 104. The image generating device 102 is placed in data communication with the user interface 102 as generally indicated at reference numeral 106. More specifically, and in some embodiments of the present invention, the image generating device 102 is placed in data communication with the hardware platform 104 through electrical coupling provided by a cable 106. In other embodiments of the present invention, the image generating device 102 is placed in data communication with the hardware platform 104 using a network (not shown).

Image generating device 102 is any device capable of generating image outputs in a tangible medium, such as, for example, a printer, a facsimile machine, a scanning device, a copier, a multifunctional peripheral device, or other like peripheral devices. Image generating device 102 generally comprises a processor 108, a memory 110, and a tangible medium generating mechanism 112. Processor 108 and memory 110 store and execute program code to control tangible medium generating mechanism 112 such that image generating device 102 has one or more functions including, but not necessarily limited to, printing, faxing, scanning, and copying.

In some embodiments of the present invention, processor 108 and/or memory 110 are suitably referred to as a raster image processor (RIP). In a preferred embodiment of the present invention, processor 108 and memory 110 store and execute program code written in the PostScript language.

Tangible medium generating mechanism 112 includes hardware that allows the mechanism 112 to produce images and/or documents in a tangible medium in one of a number of different color spaces. For example, in some embodiments of the present invention, mechanism 112 includes hardware that produces grayscale images. In other embodiments of the present invention, mechanism 112 includes hardware that produces duotone images. Typically, the term "duotone" refers to an image reproduced with two colorants. As used herein, the term "duotone" refers to an image produced with any number of combinations of non-primary colorants. Thus, the term "duotone" includes monotones, tritones, quadtones, etc. In yet other embodiments of the present invention, mechanism 112 includes hardware that produces images in color spaces other than grayscale and duotone images.

Hardware platform 104 suitably comprises a central processing unit 114, a display screen or monitor 116, a keyboard 118, and a mouse 120. Central processing unit 114 includes a processor 122 and a memory 124 for storing and executing program code. Keyboard 118 and mouse 120 are used to input data, while monitor 116 is used to view or display data, such as images and/or documents.

In various embodiments of the present invention, monitor 116 includes hardware that uses a number of primary colorants. For example, in a preferred embodiment of the present invention, monitor 116 includes hardware that produces red, green, and blue (RGB) primary colorants. In numerous other embodiments of the present invention, a suitable user interface 102 is a personal computer, a laptop computer, a mainframe computer, a computer terminal, or the like. Standing alone, or in combination, image generating device 102 and hardware platform 104 provide a system 100 for processing an image.

Figure 2:
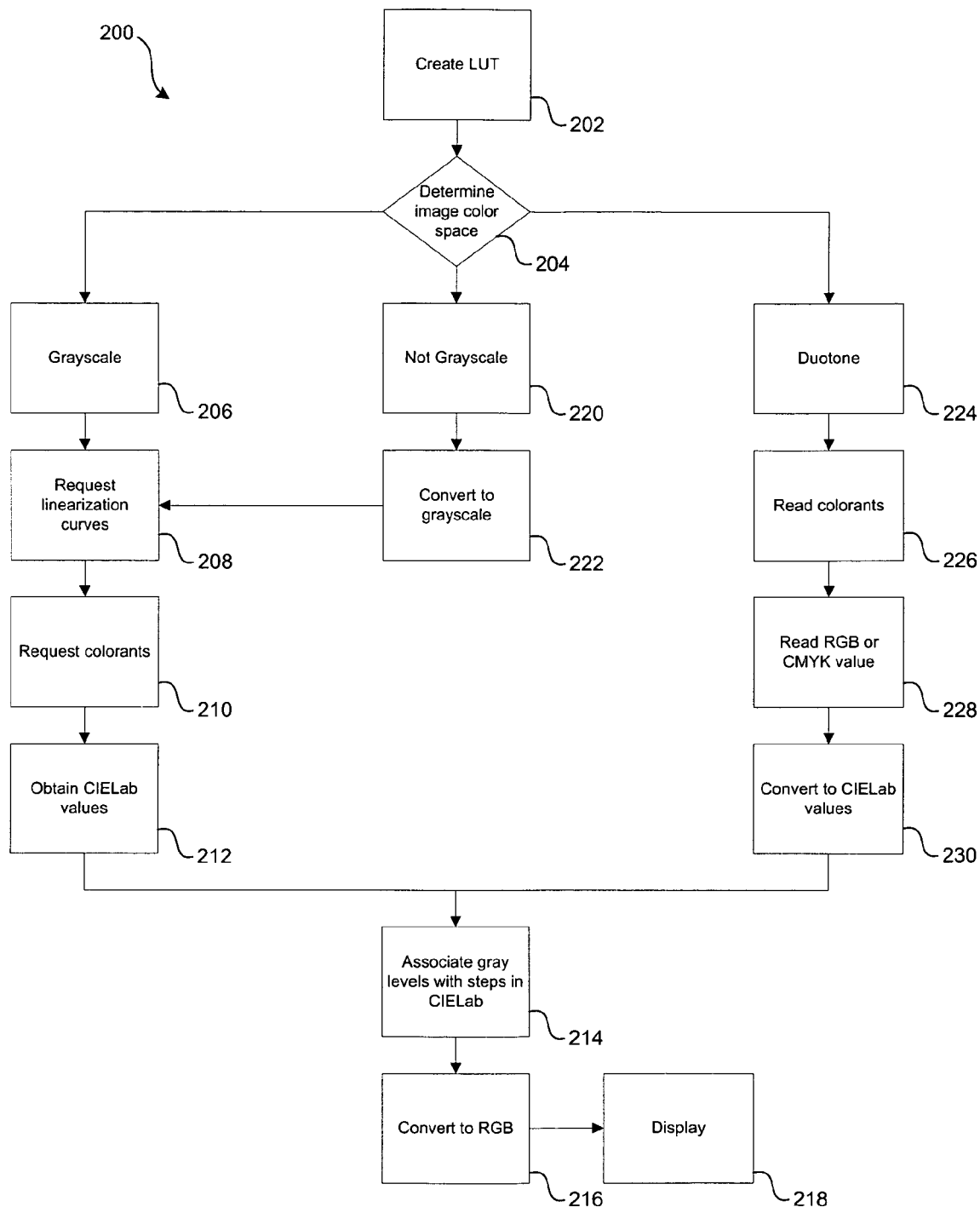
FIG. 2 is a flowchart illustrating a method for processing an image in accordance with principles of the present invention.

In view of the foregoing structural and functional features described above, methodologies in accordance with various aspects of the present invention will be better appreciated with reference to FIG. 2. FIG. 2 is a flowchart illustrating a method 200 for processing an image according to the present invention. More specifically, FIG. 2 shows an exemplary method of processing a grayscale or duotone image for display. For example, such an image is suitably generated on image generating device 102 and displayed on monitor 116, both of which are shown in FIG. 1.

While, for purposes of simplicity of explanation, the methodology of FIG. 2 is shown and described as executing serially, it is to be understood and appreciated that the present invention is not limited by the illustrated order, as some aspects suitably, in accordance with the present invention, occur in different orders and/or concurrently with other aspects from that shown and described herein. Moreover, not all illustrated features may be required to implement a methodology in accordance with an aspect of the present invention.

In addition, methodologies of the present invention are suitably implemented in software, hardware, or a combination of software and hardware. In one embodiment, for example, method 200 is stored as a computer-readable medium in memory 110 and executed by processor 108 of image generating device 102, shown in FIG. 1.

Referring now to FIG. 2 at 202, the image generating device 102 receives image data representing a source image. In one embodiment, the processor 108 of the image generating device 102 generates a three-dimensional look up table (LUT) created in the CIELab color space as defined by the Commission Internationale de l'Eclairage (CIE). The look up table is characterized by an ability to calculate 256 steps from any coordinate position in the look up table (LUT) to white. The look up table (LUT) is used to look up, reference and/or convert colorants as will be described hereinafter.

In other embodiments of the present invention, one or more formulas are suitably used to define a CIELab color space. However, those of ordinary skill in the art will appreciate that a look up table (LUT) is used to ease processing and/or improve processing speed. In yet other embodiments, a look up table or formulas suitably similarly define other color spaces.

At 204 an image, such as a PostScript image, having values and described in a color space is analyzed and the color space of the image is determined. If the image is determined to be a grayscale image, processing proceeds to 206, and if the image is determined to be a duotone, processing proceeds to 224. Again, the term "duotone" refers to an image produced with any number of non-primary colorants. Similarly, if the image is determined to be other than a grayscale or duotone image, processing proceeds to 220.

If the image is determined to be a grayscale image, a request is made for linearization curves at 208. In a preferred embodiment, such a request is made using a curves interface. At 210, a request is made for colorants. In a preferred embodiment, the request is made using a list of colorants, e.g., Pantone, interface, and the like. Moreover, the listing includes the colorant name and the colorant CIELab value. At 212, CIELab values are obtained from the list of colorants.

At 214, each gray level in the image data is associated with a corresponding step in CIELab. At 216, each image data point defined in CIELab is converted to the red, green, and blue (RGB) color space. In one embodiment, the conversion is performed using a preselected formula. In another embodiment, the conversion is performed using a look up table, such as an International Color Consortium (ICC) profile. At 218, the image is displayed.

In other embodiments of the present invention, each image data point defined in CIELab is converted to the primary colors of other color spaces. Thus, the present invention is not limited to particular primary colors in particular color spaces. Rather, the red, green, and blue (RGB) color space is merely used for purposes of illustration since monitors typically include hardware that produces red, green, and blue (RGB) primary colorants.

If the image is determined not to be a grayscale image, as indicated at 220, the image is converted to a grayscale image at 222. The conversion is performed using any suitable method known to those skilled in the art. For example, in one embodiment, the conversion is performed using a formula. In another embodiment, the conversion is performed using a look up table (LUT), e.g. an International Color Consortium (ICC) profile. Processing then continues as before beginning at 206.

If the image is determined to be a duotone, e.g., a PostScript duotone, as indicated at 224, the colorants list is read from the header of the image data at 226. Processing then continues to 212 and proceeds as discussed above.

Thus, system 100 and method 200, shown and described in conjunction with FIGS. 1 and 2, respectively, generates monitor red, green, and blue (RGB) data from PostScript code.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for processing an image, comprising:
   means adapted for receiving image data having image values and described in a first color space;
   testing means adapted for determining an image color space from a received image;
   means adapted for selectively converting received image data to grayscale image data in accordance with an output of the testing means indicative that the first color space was other than grayscale;
   means adapted for receiving selection data corresponding to a selected, secondary color outside of the grayscale; and
   means adapted for converting grayscale value of received image data into a duotone color space for display, wherein the duotone color space differs from the second color space by including additive primary colors in accordance with the selected, secondary color.

2. The system for processing an image of claim 1, further comprising:
   means adapted for generating a display from the image values in the duotone color space.

3. The system for processing an image of claim 2, wherein the duotone color space is the red, green, and blue (RGB) color space.

4. The system for processing an image of claim 1, wherein the image data is a PostScript image.

5. The system for processing an image of claim 1, further comprising:
   means adapted for creating a look up table (LUT) for at least one of looking up, referencing and converting colorant values.

6. The system for processing an image of claim 5, wherein the look up table (LUT) is a three-dimensional look up table created in CIELab color space.

7. The system for processing an image of claim 6, further comprising:
   means adapted for requesting linearization curves;
   means adapted for requesting colorants;
   means adapted for obtaining CIELab values; and
   means adapted for associating gray levels with steps in CIELab.

8. The system for processing an image of claim 6, wherein the image data is determined to be a duotone, further comprising:
   means adapted for reading colorants;
   means adapted for reading at least one of red, green, and blue (RGB) and cyan, magenta, yellow, and black (CMYK) values;
   means adapted for converting the image values to CIELab values; and
   means adapted for associating gray levels with steps in CIELab.

9. A method for processing an image, comprising the steps of:
   receiving image data having image values and described in a first color space;
   determining the image color space from a received image;
   selectively converting received image data to grayscale image data in accordance with an output of the testing indicative that the first color space was other than grayscale;
   receiving selection data corresponding to a selected, secondary color outside of the grayscale; and
   converting grayscale values of received image data into a duotone color space for display, wherein the duotone color space differs from the second color space by including additive primary colors in accordance with the selected, secondary color.

10. The method for processing an image of claim 9, further comprising the step of:
    generating a display from the image values in the duotone color space.

11. The method for processing an image of claim 10, wherein the duotone color space is the red, green, and blue (RGB) color space.

12. The method for processing an image of claim 11, wherein the image data is a PostScript image.

13. The method for processing an image of claim 9, further comprising the step of:
    creating a look up table (LUT) for at least one of looking up, referencing and converting colorant values.

14. The method for processing an image of claim 13, wherein the look up table (LUT) is a three-dimensional look up table created in CIELab color space.

15. The method for processing an image of claim 14, wherein the image data is determined to be a duotone, further comprising the steps of:
- reading colorants;
- reading at least one of red, green, and blue (RGB) and cyan, magenta, yellow, and black (CMYK) values;
- converting the image values to CIELab values; and
- associating gray levels with steps in CIELab.

16. The method for processing an image of claim 14, further comprising the steps of:
- requesting linearization curves;
- requesting colorants;
- obtaining CIELab values; and
- associating gray levels with steps in CIELab.

* * * * *